United States Patent

[11] 3,631,984

[72] Inventor Eric Rath
2415 Calle Del Cero, La Jolla, Calif. 92037
[21] Appl. No. 849,304
[22] Filed Aug. 8, 1969
[45] Patented Jan. 4, 1972

[54] METHOD AND DEVICE FOR SEPARATION OF LIQUIDS
5 Claims, 14 Drawing Figs.
[52] U.S. Cl. .................................................. 210/83,
210/170, 210/242, 210/DIG. 21, 61/1 F
[51] Int. Cl. ................................................ E02b 15/04
[50] Field of Search .......................................... 180/121,
123, 127; 210/170, 242, 523, 83, DIG. 21

[56] References Cited
UNITED STATES PATENTS
2,264,912  12/1941  Kupper ........................ 210/523 X
3,348,690  10/1967  Cornelissen ................. 210/523 X
3,420,330  1/1969   Bliss ............................ 180/123 X
3,491,023  1/1970   McCormick ................. 210/242 X Primary Examiner—Samih N. Zaharna
Attorney—Herbert C. Schulze ABSTRACT: This is a method and device for separation of liquids particularly in those situations where a contaminating liquid is entering another liquid and it is desired to contain the contaminating liquid in a limited area and separate it from the bulk of the other liquid. This is accomplished by the use of an airflow through a conduit which conduit hovers on the liquid by means of the airflow and creates a troughlike seal about the contaminating liquid and contains the same or cooperates with the conduit to remove the same by a troughlike skimming effect.

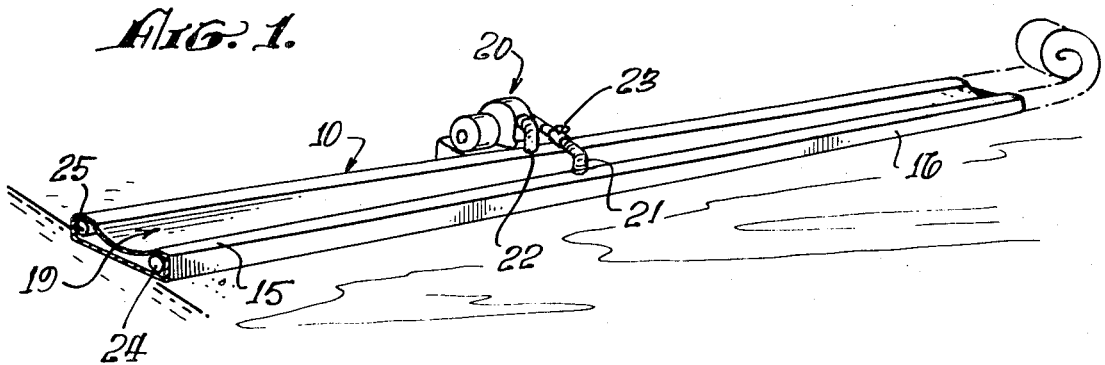
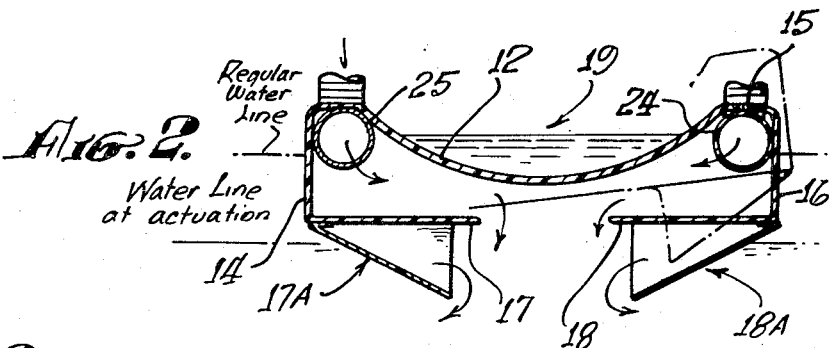
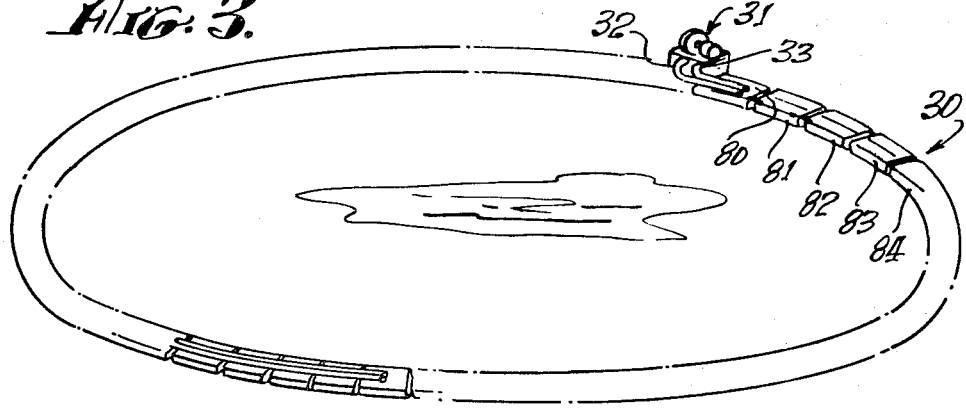
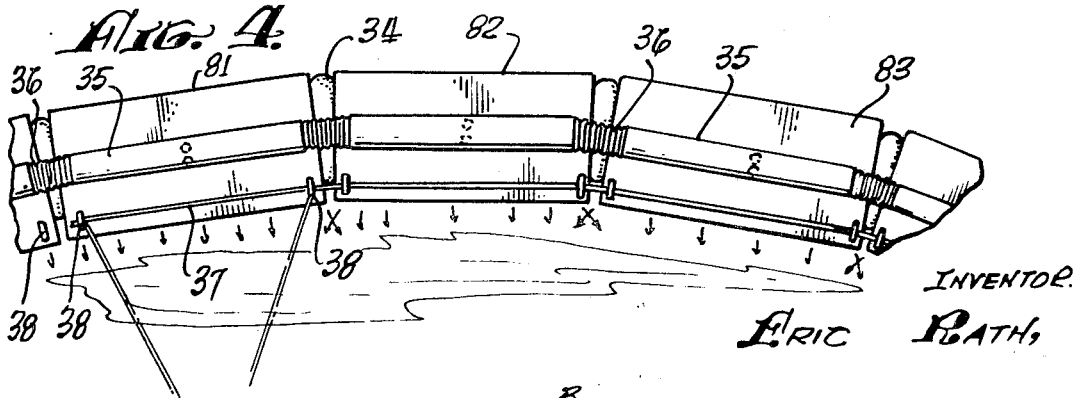

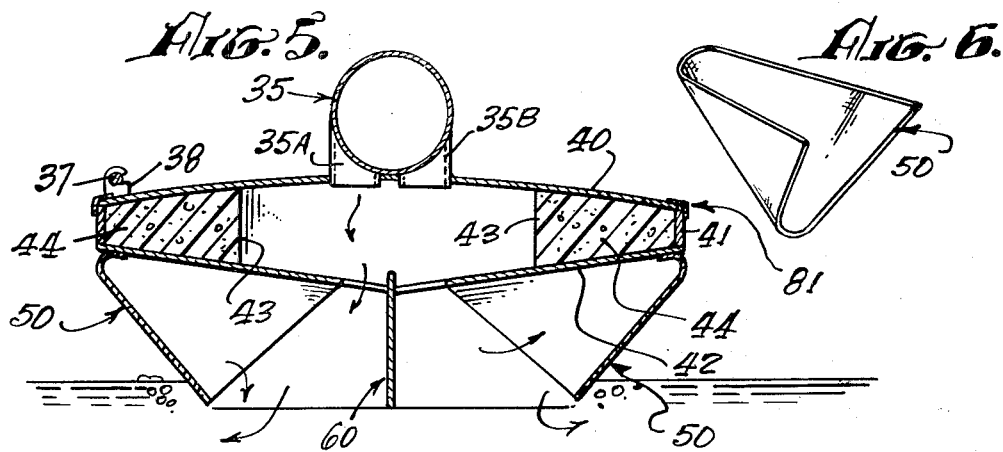
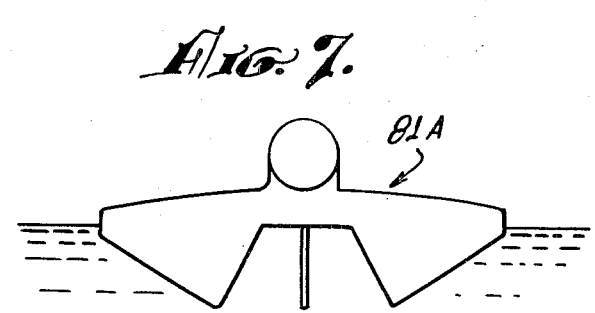
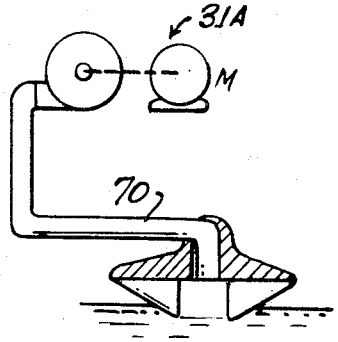
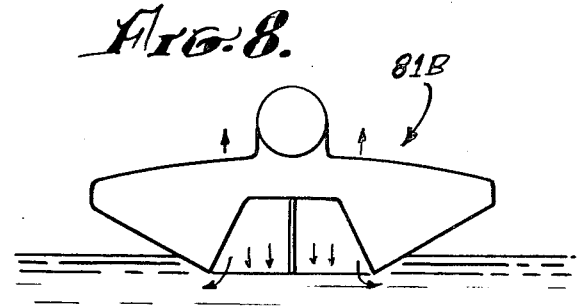
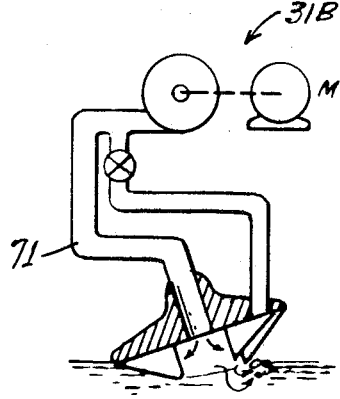
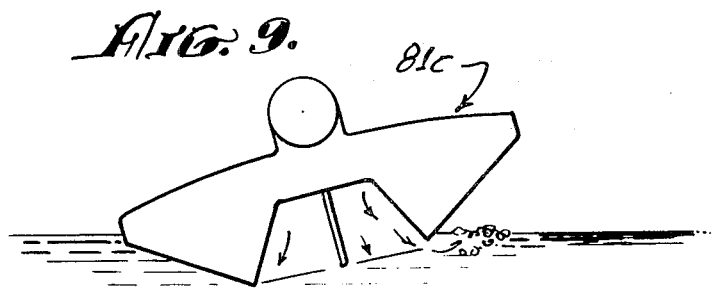

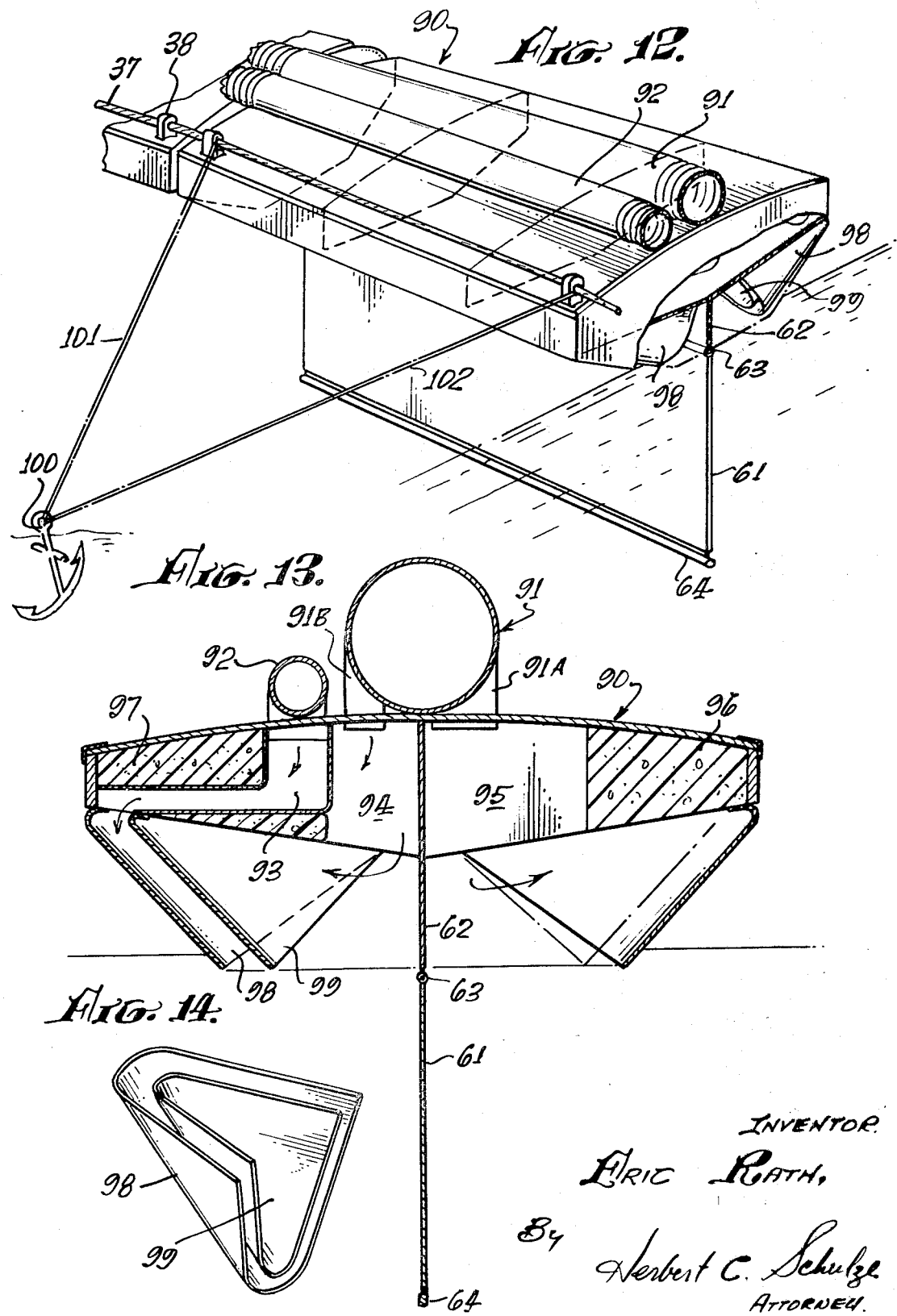

METHOD AND DEVICE FOR SEPARATION OF LIQUIDS

BACKGROUND OF THE INVENTION

1. Field of the Invention

This invention is in the general field of containment and separation of intermixed liquids and particularly by means of appropriately contained airflow streams.

2. Description of the Prior Art

There is no prior art known to the applicant which would be in the field of invention of this application. However, there have been many attempts to solve the problems and prior efforts have been directed to various means of attempting to remove contaminating liquids from base liquids. The specific field in which the greatest amount of work has been done is in the field of removing crude oils from water, particularly ocean water, such as when oils are lost through damage to ships, through leaks about ocean oil wells, and the like. There have been many efforts to direct jets of water, air and the like against such oils and to attempt in one way or another to remove them from the water in which they have been released.

The implementation of these methods known to me are ineffective, costly and inefficient and normally, due to the continuous rotary motion of large bodies of water and their natural turbulence, they are of limited value.

SUMMARY OF THE INVENTION

The public attention has been directed to the problem of oils contaminating sea water and to like problems by offshore oil-drilling problems recently encountered at Santa Barbara, California; by various freighters and tankers which have been damaged and lost oil; and the like, which have been reported in detail in newspapers and many other publications. Attempts have been made to contain or remove the oil by putting large quantities of straw onto the waters, by use of special detergent and other similar materials, by use of bubbling airstreams and liquid streams of various types, and by the use of numerous other chemical and mechanical means.

I have developed a method of containing and removing oil and similar liquid contaminants from a base liquid the have perfected a device for practicing such method. In my method, I use a single, or a multiple section duct arrangement which can be likened to a single pontoon or a series of elongated pontoons which form the air duct and also form a physical containment for the oil or other contaminant.

My device uses a skirt duct principle as disclosed in U.S. Pat. No. 3,420,330. Reference is made to said patent for details of an air skirt such as may be incorporated in certain of the embodiments of the invention described in this application.

It is an important object of this invention to provide a means for containing and separating one intermixed liquid from another by means of a controlled surface airflow upon the surface of such liquids.

It is also an object of this invention to provide a method and device for creating an air trough in a defined portion of a liquid surface for containing the surface materials within the confines of an area defined by such trough.

It is an object of this invention to provide a combined pneumatic and mechanical barrier to surface movement of liquid materials.

It is a further object of this invention to provide an adjustable fluid barrier activated by pneumatic means.

The foregoing and other objects and advantages of this invention will be clear to those skilled in the art upon reading the following description in conjunction with the drawings which accompany this application.

BRIEF DESCRIPTION OF THE DRAWINGS

FIG. 1 is a perspective of a preferred embodiment of a device of this invention for practicing the method of this invention showing the same in place upon a liquid having a contaminating fluid;

FIG. 2 is an enlarged cross section on 2—2 of FIG. 1;

FIG. 3 is a perspective showing the general configuration and certain sections of a segmented alternate embodiment of this invention;

FIG. 4 is an enlarged, partially broken away view of a portion of the embodiment shown in FIG. 3;

FIG. 5 is an enlarged cross section on 5—5 of FIG. 4;

FIG. 6 is a perspective of an air skirt;

FIG. 7 is a schematic view without detail showing one of the sections of the embodiment shown in FIG. 3 in an inactivated position;

FIG. 8 is the same view as FIG. 7 but showing the section in its normally activated position;

FIG. 9 is the same as FIG. 8 except that it is shown in its tilted activated condition;

FIG. 10 is a schematic drawing indicating an activated unit similar to FIG. 8 but showing a different configuration and air supply;

FIG. 11 is the same as FIG. 10 except that an alternate and additional air supply is shown for tilting;

FIG. 12 is a partially broken away viewing of an alternate embodiment using double skirts and an alternate second air supply; and FIG. 13 is a section on 13—13 of FIG. 12; and FIG. 14 is a perspective of the construction of a double air skirt.

DESCRIPTION OF A PREFERRED EMBODIMENT

In its simplest form, the method of containing a liquid within a larger body of liquid, as for example shown in FIG. 1, comprises the formation of a duct for air and fluid wherein the action of the air causes the duct itself, together with a fluid containment, to form a dikelike arrangement as well illustrated particularly in FIG. 2. This dikelike arrangement is shown to comprise a flexible material such as plastic or the like formed in the general configuration as indicated in FIGS. 1 and 2 comprising a basic portion 12 which forms a troughlike arrangement 19 having a pair of shoulders 13 and 15 with depending edges 14 and 16 and lower portions 17 and 18, all formed in one continuous piece of indeterminate length.

Air ducts 24 and 25 are provided in the area of the shoulders 13 and 15 as indicated. These air ducts are supplied with air from a portable air-generating unit consisting of a suitable motor and air blower or the like 20 and interconnected by hoses 21 and 22 with a regulating valve 23 in one or more of the lines if desired. The details of such an air pressure creating unit are well known in the trade and are not exemplified here.

The air duct 24 and 25 will be formed of suitable material to distribute air either generally throughout the configuration of the shape or at suitable intervals by independent openings and closures (not shown).

A series of air skirts such as described in U.S. Pat. No. 3,420,330, referred to above, and indicated by the numerals 17A and 18A, and in the general configuration as indicated in FIG. 6, are positioned along the lower edges 17 and 18.

In activation, the air supply is activated and a length of the material is rolled out across whatever fluid is the basic fluid as indicated in FIG. 1. When the air is not being activated the relative position of the unit will be as indicated by the "regular waterline" on FIG. 2. When activated, however, the air skirts as well as the pressure of the air in general will raise the unit so that it floats, or hovers, at a higher elevation and just above the waterline. The air skirts themselves will be touching the water but the basic unit will be above the water. Water which will be normally entrapped within the trough 19 will act as a sort of ballast for the unit and preserve its stability.

Oil or the like leaking into the basic area, such as a bay or the like, will thus be entrapped behind the unit 10. Air will be escaping constantly under the skirts and will create a troughlike turbulence at the edge of the unit (for example along edge 16) which will entrap the oil and hold it within the confines and behind the barrier thus created.

Oil being a major problem, this is one of the items attacked very heavily by this invention.

When crude oil leaks into salt water, the crude oil has a density of approximately 54 pounds per cubic foot. The oil is comprised of asphaltic-type materials together with volatile matter. As the volatile matter ultimately escapes from the asphalticlike material, the final asphaltic product has a higher density somewhere in the neighborhood of 72 pounds per cubic foot.

Since sea water has a density of approximately 62 pounds per cubic foot, the initial influx of the crude oil will float to the surface. It then spreads indefinitely doing great damage as is well known. However, if it can be contained, as it is by my invention, the volatile materials will gradually dissipate and the heavier asphalts will drop harmlessly to the floor of the ocean area.

While the foregoing description describes how the heavy asphalt residue may be forced to gradually settle to the bottom, it should also be understood that while confined by my invention, if desired, the oils can be easily removed by pumping from the surface and from the limited area where they are now under confinement.

In those cases where there is an oil leak, for example as from a submerged ship, or an oil well at some distance from shore, it is not necessarily economical to to attempt to wall off a large portion of the ocean surface. In such cases it may be more desirable to form a circular or irregularly shaped, confined area to surround the surface leak area. Such a system is shown in FIG. 3, utilizing the basic principles of my invention. In FIG. 3 an oil leak is shown, surrounded by a series of segmented air-activated units. It will be noted that there is an air supply unit 31 with air ducts 32 and 33. No further description is given since such air supply unit is well known in the trade and can consist of a simple motor and blower arrangement with the air being generated by the blower confined and directed to the appropriate areas of the unit 30 comprised of individual segments 80, 81, 82, 83, 84, etc.

FIG. 4 shows a few of the segments from a plan view and indicates the way they are held together and interconnected by air ducts. It will be seen that each one of the segments, 81, 82, 83, etc., carries a duct 35 with a flexible coupling such as a rubber hose or the like 36 connecting each of the air ducts 35 by customary means. A cable 37 runs the entire length of the entire unit 30 as shown in FIG. 3. Cable 37 is fastened at its ends to make a continuous loop depending upon the number of units and the size of the installation. Each of the sections 81, 82, etc., has two eyes or clamps 38 so positioned as to hold the cable adjacent its ends on one side. The segments 81, 82, 83, etc., are protected one from another against damage by bumping and the like by the use of inflatable dunnage 34 or other suitable dumper material. Inflatable dunnage is well known in the trade and it will be clear that sponge rubber or the like could be used at 34 and between the other joints in order to cushion the various segments from one another.

It will be noted that the edges to which the cable is attached are closer together than the edges or ends of the individual segments at their outer surface. In this way these rigid units can be formed into circular or other shapes.

FIG. 5 illustrates a cross section of one of the segments, for example 81, comprising the units shown in FIGS. 3 and 4. It will be noted that this is a simple device having the central air duct 35 with interconnecting ducts 35A and 35B to its two interior sides. The wall between the two sides assures an even flow of air between the two sides of the entire unit. A rib or the like 43 intermediate each of the sides forms a partition behind which a flotation material 44 such as foam or the like may be placed to ensure against the unit sinking in the water in the event of failure of the air supply or other mishap.

The unit is formed of a relatively rigid material such as a fiber glass reinforced plastic. A somewhat concave upper surface 40 has shoulders 41 and lower surfaces 42. Surfaces 42 have sufficient interrupted areas such as indicated by the arrows on FIG. 5 to allow air to flow out. A keel 60 is provided for stability and air skirts 50, again as described in the patent referred to above, are provided for containment of the air in order to allow the unit to hover over the water.

By suitable control of the supply of air to one side or the other (by means not shown but customary and known to anyone skilled in the art, such as valves, reduced size of either 35A or 35B, and by other means such as by pressure upon the cables 37 at one edge) the entire unit may be caused to hover in a tilted position. FIGS. 7, 8 and 9 explain this more clearly. FIG. 7 shows a unit in the water with no air being used. When the air pressure is applied so that it is equal to both sides, the unit hovers above the water as indicated in FIG. 8. By adding more air to one side or taking air from the other side or by suitable weighting on one side or the other, the unit may be made to tilt as indicated in FIG. 9.

The advantage of the tilting is to allow excess air to escape on one side and to make a "washing" and turbulating area to overcome the spreading action of a film of oil or the like on the water where there is danger that it may encroach upon the units.

FIG. 10 and FIG. 11 illustrate schematically how a unit may be made to tilt at any given angle in a very effective way. In FIG. 10 there is illustrated an air supply 31A with an air duct 70 and shows how the air would flow evenly causing the unit to hover over the water in a horizontal position.

In FIG. 11, however, the air supply 31B has a principal duct 71 and an auxiliary duct 72 which adds extra air to the air skirts on that side. In this manner, excess air spillage forms an actual trough in the water as indicated for better containment and control of the contaminating fluid.

FIG. 12 and FIG. 13 show a more refined unit than the unit described in FIG. 5. This unit embodies the principle as shown schematically in FIG. 11. Also, this unit utilizes a so-called "double skirt arrangement" for the air control and hoverability.

It will be noted that one segmented element 90 is particularly illustrated and has a main air duct 91 together with auxiliary air duct 92. It is understood that these air ducts are connected to a central air supply, the details of which will not be discussed. Air duct 91 has two intercommunicating inlets for air 91A and 91B allowing air to escape into chambers 94 and 95. The air duct 91A can be larger than air duct 91B if desired, to allow more air to be flowing to that side. It will be noted that rudder wall extension 62 separates the two streams of air and rudder 61 hinged at 63 and with weight 64 is added for stability.

An auxiliary air duct 92 is provided to service the outer portion of the double skirts as well indicated in FIG. 13. Flotation chambers 96 and 97 are supplied for the same purpose as the flotation chambers heretofore described.

The air from duct 92 is transmitted through appropriate passages 93 to the outer portion of the double skirt to provide for excessive tilt where desired.

Under these circumstances, the normal air will be captured by the inner portion 99 of a double skirt with the outer portion 98 of the double skirt taking the air from 93.

Thus the basic hovering will be accomplished through the inner skirts 99 and the tilt control will principally be accomplished by the outer portion 98 of the double skirt.

It will probably be desired to add anchors as indicated by 100 at various intervals and to various sections and such anchors will be controlled by anchor lines 101 and 102 as may be desired from time to time.

In operation, any of the units is activated with air and hovers in the manner of a hover-craft boat or the like above the water. The air skirts act in the manner as described in the patent heretofore referred to and make excellent hoverability with minimum air escape. Additionally, however, by the tilting action from time to time, the escaping air can be made to form a trough in the water and sufficient turbulence that the contaminating liquids, such as oil or the like, can be drawn into the trough and pumped from this artificially created trough in the water or otherwise controlled in a confined area until such time as their equilibrium reaches the point where they will sink to the bottom.

While the embodiment of this invention shown and described is quite capable of accomplishing the objects and advantages desired, these embodiments are for illustrative purposes only and are not limiting embodiments.

I claim:

1. The method of isolating a contaminant from a liquid body wherein said contaminant floats or is suspended in said liquid body comprising: directing a jet against a portion of the liquid body directionally so that the contaminant is confined upon and within a limited portion of said liquid body, said jet being so directed upon the liquid body as to cause a trough to be formed therein, and said jet being directed from a body supported upon said liquid body by means of an air cushion.

2. A device for containing a contaminant upon the surface of a liquid body comprising: a plurality of individual segments, all of said segments being joined together to form a continuous confining wall; duct means carried by said segments, each of said duct means intercommunicating with the interior of said segments; pivoting keel means attached to each of said segments and depending downwardly therefrom; air skirt means attached to each of said segments for confining a portion of the airflow from the interior of each of said segments; means attaching each of said segments at each end thereof to another of said segments; means to adjust the flow through each of said segments in such manner as to cause each of said segments to tilt as desired in order to allow a certain portion of the airflow to escape from one or the other of the under sides of each of said segments; and means to supply air under pressure to said ducts.

3. A device for containing a contaminant upon the surface of a liquid body comprising: jet carrying means; means supporting said jet carrying means upon the surface of said liquid; means to direct said jet against the surface of said liquid in such manner that a trough is formed upon said liquid; means to vary the angle of flotation of said jet carrying means; means to confine the contaminant; and means to remove the contaminant confined by said device.

4. A device for containing a contaminant upon the surface of a liquid body comprising: jet duct means connected to a pressure source; means supporting said duct means over the surface of the liquid body, comprising air skirts being filled in such manner as to cause the unit to hover over the liquid body; means to maintain said duct and its support in a confined area; and means to direct jetstreams from said duct upon the surface of the liquid body in such manner as to cause a trough to be formed adjacent said duct means and within said confined area and thereby contain said contaminant within said trough and confined area and upon the surface thereof.

5. The device of claim 4 in which separate means are provided to control the hovering of said device.

* * * * *